United States Patent
Michael

(10) Patent No.: US 9,415,409 B2
(45) Date of Patent: Aug. 16, 2016

(54) DEVICE FOR CONVEYING COATING POWDER FROM A POWDER CONTAINER

(71) Applicant: GEMA SWITZERLAND GMBH, St. Gallen (CH)

(72) Inventor: Hanspeter Michael, Gossau (CH)

(73) Assignee: GEMA SWITZERLAND GMBH, St. Gallen (CH)

( * ) Notice: Subject to any disclaimer, the term of this patent is extended or adjusted under 35 U.S.C. 154(b) by 4 days.

(21) Appl. No.: 14/407,028

(22) PCT Filed: May 23, 2013

(86) PCT No.: PCT/EP2013/060665
§ 371 (c)(1),
(2) Date: Dec. 10, 2014

(87) PCT Pub. No.: WO2013/189686
PCT Pub. Date: Dec. 27, 2013

(65) Prior Publication Data
US 2015/0151319 A1 Jun. 4, 2015

(30) Foreign Application Priority Data
Jun. 20, 2012 (DE) .......................... 10 2012 210 439

(51) Int. Cl.
*B05C 19/06* (2006.01)
*B05D 1/12* (2006.01)
(Continued)

(52) U.S. Cl.
CPC ............... *B05B 15/02* (2013.01); *B05B 5/1683* (2013.01); *B05B 7/1454* (2013.01);
(Continued)

(58) Field of Classification Search
USPC ........ 118/308, 309, 302; 406/43, 44, 49, 197, 406/198
See application file for complete search history.

(56) References Cited

U.S. PATENT DOCUMENTS

| 3,501,062 A | * | 3/1970 | De Witt et al. | ........ B05B 7/1445 222/161 |
| 6,176,647 B1 | * | 1/2001 | Itoh | ...................... B05B 5/1683 406/14 |

FOREIGN PATENT DOCUMENTS

| DE | 2542170 A1 | 4/1976 |
| DE | 4405640 A1 | 8/1994 |

(Continued)

OTHER PUBLICATIONS

International Preliminary Report on Patentability for PCT/EP2013/060665, dated Dec. 23, 2014.
International Search report dated Nov. 13, 2012 for PCT/EP2013/060665.
Written Opinion from related German Application No. 102012210439.9, dated Apr. 4, 2013.

*Primary Examiner* — Yewebdar Tadesse
(74) *Attorney, Agent, or Firm* — Kinney & Lange, P.A.

(57) ABSTRACT

The invention relates to a device for conveying coating powder from a powder container. The powder conveying device has a powder conveying pipe having a powder inlet, by means of which coating powder can be fed from a powder container to the powder conveying pipe, in particular by means of suction. Furthermore, a powder conveying pipe retainer is provided in order to retain the powder conveying pipe. The powder conveying pipe can be preferably optionally moved in relation to the powder conveying pipe retainer in the longitudinal direction of the powder conveying pipe, wherein in order to clean the powder conveying pipe, the powder inlet of the powder conveying pipe can be closed and a compressed air line can be connected to the powder pipe.

17 Claims, 5 Drawing Sheets

(51) Int. Cl.
  *B05B 15/02*  (2006.01)
  *B05B 5/16*  (2006.01)
  *B05B 7/14*  (2006.01)
  *B05B 12/14*  (2006.01)
  *B05B 15/12*  (2006.01)
  *B05B 15/00*  (2006.01)
  *B65G 53/26*  (2006.01)

(52) U.S. Cl.
  CPC ............ *B05B 7/1472* (2013.01); *B05B 7/1477* (2013.01); *B05B 12/14* (2013.01); *B05B 15/1229* (2013.01); *B05B 15/005* (2013.01); *B65G 53/26* (2013.01); *Y02P 70/36* (2015.11)

(56) References Cited

FOREIGN PATENT DOCUMENTS

| | | |
|---|---|---|
| DE | 29518478 U1 | 1/1996 |
| DE | 19517229 A1 | 11/1996 |
| DE | 29923669 U1 | 4/2001 |
| DE | 10337226 A1 | 3/2005 |
| DE | 102004024447 A1 | 12/2005 |
| WO | 0115813 A2 | 3/2001 |

\* cited by examiner

DEVICE FOR CONVEYING COATING POWDER FROM A POWDER CONTAINER

BACKGROUND

The invention relates to a device for conveying coating powder out of a powder container.

In particular, the invention relates to a device for conveying powder or powdered material, particularly coating powder, whereby a powder pump is used to suction powder out of a powder container through a powder conveying tube fluidly connected or connectable to the powder pump.

The powder pump can for example be realized in the form of an injector having a carrier gas connector fluidly connected or connectable to a carrier gas line for conveying carrier gas, particularly conveyor air. The injector preferably further comprises a dosing gas connector connected or connectable to a dosing gas line for the regulated supplying of dosing gas, particularly dosing air, wherein the carrier gas is fed to the injector such that an area of negative pressure forms in the injector.

The invention further relates to a powder supply device for a powder coating system, wherein the powder supply device comprises at least one powder conveying device of the above type as well as at least one powder container.

Lastly, the invention further relates to a method for cleaning a powder conveying device of the above type.

Powder manufacturers supply spray coating powder to spray coating companies in powder containers, whereby such powder containers are frequently bags of powder. The spray coating companies thereafter use a spray coating system to spray the coating powder onto the objects to be coated. Heat is then applied to fuse the coating powder to the coated objects.

Powder bags, in which spray coating powder is commonly delivered to spray coating companies, can have the usual shape of a bag. They can also be formed from a plastic tube sealed at the top and bottom which is then cut open at the top in order to discharge the coating powder.

During the time coating powder is being drawn from them in the spray coating system, the powder bags often stay in the dimensionally stable carton in which the powder manufacturer supplied the respective powder bag.

Powder conveying devices are used in order to conduct coating powder out of the powder container of a spraying device. Such a powder conveying device normally comprises a powder pump, such as for example an injector, as well as a powder conveying tube connected to the intake connector of the powder pump, by means of which coating powder from the powder container is supplied to the spraying device for the spray coating of objects.

The principle behind injectors for pneumatically conveying coating powder from a powder container to a spraying device is generally known from e.g. powder coating technology. Spraying devices to which coating powder can be pneumatically conveyed by means of injectors can take the form of manually operable guns or automatically controlled sprayers. As shown by the U.S. Pat. No. 3,521,815 A, U.S. Pat. No. 4,802,625 A and U.S. Pat. No. 4,788,933 A printed publications, spraying devices can have varying configurations depending on the desired spraying method.

Spraying devices are known from the latter two cited printed publications which, in addition to a powder/gas flow, can also be fed cleaning gas which flows over electrodes to electrostatically charge the coating powder and thereby clean said electrodes and keep them free from powder deposit impurities. The high voltage for the electrodes can be produced in known manner by a high voltage generator incorporated into the spraying device or by an external high voltage generator. The high voltage of the high voltage generator creates a grounded electrostatic field between the electrodes and an object to be coated along which the coating powder particles flow from the spraying device to the object.

In order to achieve a constant flow rate for the powder/air mixture, the airspeed in the fluid lines, thus in particular in the powder conveying tubes, preferably needs to have a value between 10 to 15 m/s. At lower fluid line airspeed, powder conveyance becomes erratic; pulsation occurs in the powder/air mixture which continues through to the powder outlet on the spraying device. Higher airspeeds seriously impede the electrostatic depositing of coating powder on the object to be coated because they are coupled with the risk of blowing off the powder which has already settled onto the object.

The amount of powder fed to the spraying device is increased or decreased depending on the requirements of the coating process. One value from practical experience for the amount of powder supplied per unit of time is 300 g/min. When the amount of powder supplied per unit of time needs to be reduced, first the pressure at which the conveyor air is supplied to the injector is reduced. Doing so thus also reduces the flow rate of the conveyor air in the fluid lines. However, the total volume of air cannot become too low nor exceed a maximum value. In order to offset the reduction in the amount of air; i.e. so as to restore the airspeed to at least 10 m/s while maintaining the reduced powder output, more dosing air is supplied to the injector. The known operation of the injector is as follows:

The conveyor air produces a negative pressure in the injector which causes coating powder to be sucked out of a powder container, get picked up by the conveyor air and conducted through fluid lines of the spraying device. By changing the pressure, and thus also the amount of conveyor air, the amount of coating powder supplied per unit of time can be regulated. Since the conveying capacity is a function of the magnitude of the negative pressure created by the conveyor air in the injector, at constant or variable conveyor air, the conveyor air can also be regulated by introducing dosing air into the negative pressure area of the injector in order to change the magnitude of the negative pressure according to the desired powder feed rate. This means that the powder feed rate is not dependent solely on the volume of conveyor air but rather the difference of the conveyor air minus the dosing air. However, for the reasons given above, the total volume of air conveying the coating powder must remain constant during a given coating procedure.

A pneumatic powder conveying device of the above type; i.e. a device comprising a powder conveying tube and at least one powder pump, e.g. in the form of an injector, is particularly suited to supplying powder to powder coating systems which electrostatically spraycoat objects with powder in which fresh coating powder (also called "fresh powder" in the following) and reclaimed coating powder as applicable (also called "recovery powder" in the following) are in the powder container and are conveyed by a pneumatic powder conveying device of a spraying device of the type cited at the outset. As indicated above, the spraying device can for example be a manual gun or an automatic gun.

WO 01/15813 A2 discloses a device for conveying coating powder out of a powder container having a powder conveying tube with a powder inlet via which coating powder from a powder container can be fed to the powder conveying tube by suction, and a powder conveying tube retainer to hold the powder conveying tube, wherein the powder conveying tube is selectively displaceable relative to the powder conveying tube retainer in the powder conveying tube's longitudinal direction, and wherein for the purpose of cleaning the powder conveying tube, the powder inlet of the powder conveying tube can be closed and a compressed air line can be connected to the powder conveying tube, wherein the powder conveying tube retainer has a guide region with an opening arranged coaxially and concentrically to the longitudinal axis of the powder conveying tube through which at least part of the powder conveying tube extends.

SUMMARY

The invention is based on the problem of powder coating systems, and in particular the powder conveying devices used in the powder coating systems, needing to be thoroughly cleaned when the powder is changed (changing from one type of powder to another type of powder), particularly when changing colors (changing from powder of a first color to a powder of another color), since even just a few powder particles of the previous type of powder can result in coating defects when coating with the new powder type.

The object which the invention is to accordingly achieve is to provide a quick option for easily changing powder.

Accordingly, a device for conveying coating powder out of a powder container is in particular proposed, wherein the device comprises a powder conveying tube and a powder conveying tube retainer to hold the powder conveying tube. The powder conveying tube has a powder inlet via which coating powder can be fed to the powder conveying tube from a powder container, particularly by suction. The powder conveying tube is retained by the powder conveying tube retainer such that the powder conveying tube is preferably selectively displaceable relative to the powder conveying tube retainer in the powder conveying tube's longitudinal direction. For the purpose of cleaning the powder conveying tube, particularly upon a change in color or powder, the powder inlet of the powder conveying tube can be closed and a compressed air line connected to the powder conveying tube. The powder conveying tube retainer has a guide region comprising an opening arranged axially and concentrically to the powder conveying tube's longitudinal axis, wherein at least part of the powder conveying tube extends through the opening. A slider/closure assembly comprising a slider/closure element is provided which is displaceable relative to the powder conveying tube retainer and relative to the powder conveying tube extending at least in part through the opening of the powder conveying tube retainer from a first position, in which the slider/closure element at least partly covers a through-hole of the opening formed in the guide region, into a second position, in which the slider/closure assembly uncovers the through-hole of the opening formed in the guide region such that the powder conveying tube can displace relative to the guide region through the opening of the guide region in the powder conveying tube's longitudinal direction. A compressed air outlet of the compressed air line is connected to the slider/closure element such that the compressed air outlet leads into the through-hole of the opening formed in the guide region in the first position of the slider/closure element.

It is hereby advantageous for the guide region opening to form an annular chamber inside the guide region with a section of the powder conveying tube extending through the opening which at least partially encloses the powder conveying tube section extending through the opening of the guide region.

In order to also achieve cleaning of particularly the outer surface area of the powder conveying tube of any powder residue that may have adhered to it during the course of a powder change, a further development of the inventive solution provides for a wiper assembly which interacts with the section of the powder conveying tube extending at least partially through the opening of the guide region such that upon the powder conveying tube displacing relative to the powder conveying tube retainer in the longitudinal direction of the powder conveying tube, any powder residue which may have adhered to the outer surface area of the powder conveying tube can be at least partly mechanically wiped off the outer surface area of the powder conveying tube.

Additionally or alternatively to the wiper assembly for mechanically wiping off any given powder residue from the outer surface area of the powder conveying tube, it is advantageous to provide a preferably selectively connectable residual powder extractor in order to be able to draw off any powder residue which may have adhered to the outer surface area of the powder conveying tube when needed. This applies in particular when the powder conveying tube is displaced relative to the powder conveying tube retainer in the powder conveying tube's longitudinal direction.

The residual powder extractor preferably comprises a suction tube connected or connectable to a vacuum source or other such suction mechanisms, by means of which at least a portion of the powder residue adhering to the outer surface area of the powder conveying tube can be suctioned off as needed.

One preferred realization of the inventive solution provides for an intake-side end section of the suction tube of the residual powder extractor to be in or able to be brought into fluid connection with the annular chamber at least partially enclosing the powder conveying tube section.

To effectively clean inside the powder conveying tube as well as effectively clean a powder pump, particularly an injector, disposed at the powder conveying tube outlet, introducing the cleaning or flushing gas fed into the powder conveying tube in pulses has been shown to be advantageous, since by doing so, any powder particles which may have adhered to the inner walls of the powder conveying tube and/or the powder pump or to the inner wall of other powder lines connected to the powder conveying tube or the powder pump can be particularly effectively dislodged. The fact that a not inconsiderable surface layer can form when the system is flushed with a continuous flow of flushing gas is to be factored in here. Due to this resultant surface layer, it is then frequently the case that particles adhering to the inner walls of the powder conveying tube or to a powder pump connected to the powder conveying tube or to the inner wall of a powder line connected as needed to the powder pump cannot be dislodged.

In order to be able to introduce the gas (compressed air) provided for cleaning or flushing purposes into the system in pulsed manner during the cleaning mode of the powder conveying device, one advantageous realization of the inventive solution provides for a controllable valve, particularly a controllable spring-loaded 2/2-way valve, which is fluidly connected or connectable to the compressed air line connectable to the powder conveying tube and which can be controlled by a control unit so as to supply the flushing gas in pulses particularly during the cleaning mode of the powder conveying device.

The powder conveying device according to the invention is particularly suited to use in a powder supply device for a powder coating system in which additionally to the powder conveying device, at least one powder container having a powder chamber for coating powder is provided, wherein powder intake ensues for example by means of an injector connected to the powder conveying tube and wherein the intake-side end section of the powder conveying tube projects into the powder container.

The invention not only relates to the previously described pneumatic powder conveying device but also to a method for cleaning such a powder conveying device, particularly when changing color or powder.

The following will reference the accompanying drawings in describing exemplary embodiments of the inventive solution.

BRIEF DESCRIPTION OF THE DRAWINGS

FIG. 3 a perspective view of a powder spray coating cart comprising an example embodiment of the inventive powder conveying device using a powder conveying tube in accordance with FIG. 2a;

DETAILED DESCRIPTION

Figure 1:
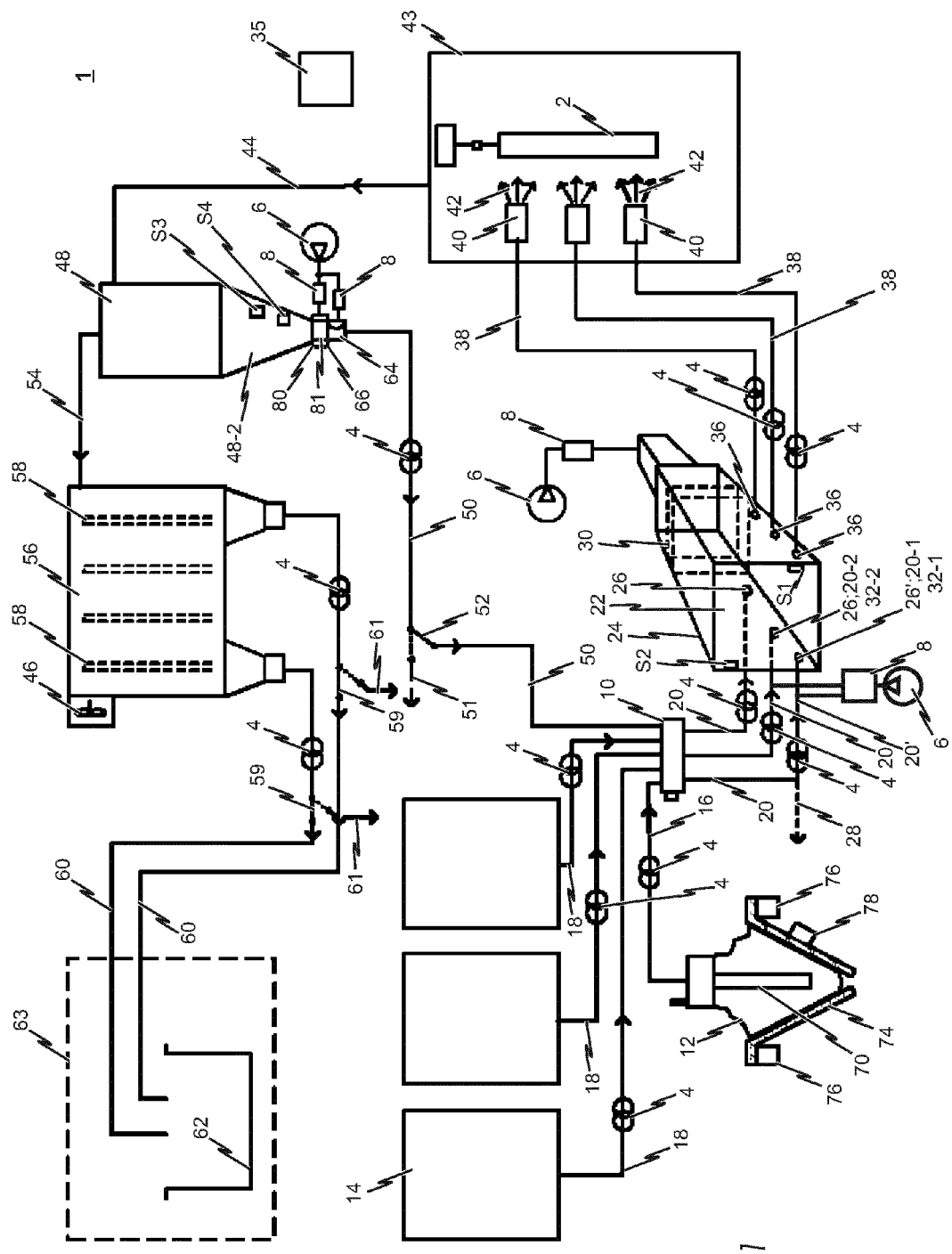
FIG. 1 a schematic view of a powder coating system as an example of one of a plurality of different types of powder coating systems in which the inventive powder conveying device can advantageously be used.

FIG. 1 shows a schematic view of an example embodiment of a powder coating system 1 for spray coating objects 2 with coating powder which is then fused onto the objects 2 in a heating furnace not shown in FIG. 1. One or more electronic control devices 35 are provided to control the operation of the powder coating system 1.

Powder pumps 4 are provided for pneumatically conveying the coating powder. These can be injectors with which coating powder is sucked out of a powder container by means of compressed air serving as conveyor air, after which the mixture of conveyor air and coating powder then flows together into a container or to a spraying device.

Suitable injectors are known for example from printed publication EP 0 412 289 B1.

Pumps which consecutively convey small portions of powder by means of compressed air can also be used as powder pumps 4, wherein a small portion of powder (powder quantity) is in each case stored in a powder chamber and then expelled from the powder chamber by compressed air. The compressed air remains behind the portion of powder and pushes the portion of powder ahead of itself. These types of pumps are sometimes referred to as compressed air thrust pumps or plug pumps because the compressed air pushes the stored portion of powder in front of it through a pump outlet line like a plug. Various types of such powder pumps for conveying compact coating powder are known for example from the following documents: DE 103 53 968 A1, U.S. Pat. No. 6,508,610 B2, US 2006/0193704 A1, DE 101 45 448 A1 and WO 2005/051549 A1.

To produce the compressed air for pneumatically conveying the coating powder and for fluidizing the coating powder, a compressed air source 6 is provided which is connected to the various devices by means of corresponding pressure-setting elements 8, for example pressure regulators and/or valves.

A powder pump 4 feeds fresh powder from a powder supplier from the supplier's container, which can for example be a small container 12, e.g. in the form of a dimensionally stable container or bag containing a powder quantity of for example between 10 and 50 kg, e.g. 35 kg, or for example a large container 14, e.g. likewise a dimensionally stable container or bag containing a powder quantity of for example between 100 and 1000 kg, into a fresh powder line 16 or 18 of a screen device 10. The screen device 10 can be provided with a vibrator 11. In the following description, both terms "small container" as well as "large container" respectively denote "dimensionally stable container" as well as "non-dimensionally stable flexible bag" unless explicit reference is made to one or the other type of container.

The coating powder filtered by the screen device 10 is conveyed by gravity or preferably by a respective powder pump 4 through powder inlet openings 26, 26' in a powder chamber 22 of a dimensionally stable powder container 24 via one or more powder supply lines 20, 20'. The volume of the powder chamber 22 is preferably considerably smaller than the volume of the small fresh powder container 12.

According to one conceivable realization of the inventive solution, the powder pump 4 of the at least one powder supply line 20, 20' to the powder container 24 is a compressed air thrust pump. The first section of the powder supply line 20 can hereby serve as the pump chamber into which coating powder filtered by the screen device 10 drops through a valve, for example a pinch valve. Once the pump chamber contains a certain portion of powder, the fluid connection between the powder supply line 20 and the screen device 10 is cut off by closing the valve. Compressed air then pushes the portion of powder through the powder supply line 20, 20' into the powder chamber 22.

Powder pumps 4, for example injectors, are connected to one or preferably a plurality of powder outlet openings 36 of the powder container 24 to convey the coating powder through powder lines 38 to the spraying devices 40. The spraying devices 40 can comprise spray nozzles or rotary atomizers for spraying the coating powder 42 onto the object 2 to be coated which is preferably located in a coating booth 43.

A suction air flow from a fan 46 sucks coating powder 42 which does not adhere to the object 2 to be coated through an excess powder line 44 into a cyclone separator 48 as excess powder. As much excess powder as possible is separated from the suction air flow in the cyclone separator 48. The separated portion of powder is then routed as reclaimed powder or recovery powder through a reclaimed powder line 50 from the cyclone separator 48 to the screen device 10, where it passes through said screen device 10 and is then returned, either alone or mixed with fresh powder, to the powder chamber 22 via powder supply lines 20, 20'.

Depending on the type of powder and/or the degree of powder contamination, the option can also be provided of disconnecting the reclaimed powder line 50 from the screen device 10 and routing the reclaimed powder (recovery coating powder) into a waste receptacle as is schematically depicted in FIG. 1 by broken line 51. So that the reclaimed powder line 50 does not need to be separated from the screen device 10, it can be provided with a deflector 52 for making it alternatingly connectable to the screen device 10 or to a waste receptacle.

The powder container 24 can comprise one or more, preferably two, sensors S1 and/or S2 for controlling the feed of coating powder into the powder chamber 22 by means of the control unit 3 and the powder pumps 4 in the powder supply lines 20, 20'. For example, the lower sensor S1 detects a lower powder level limit and the upper sensor S2 an upper powder level limit.

The lower end section 48-2 of the cyclone separator 48 can be designed and used as a storage reservoir for reclaimed powder and provided with one or more, for example, two sensors S3 and/or S4 operatively connected to the control unit 3 for that purpose. In so doing, the feed of fresh powder through fresh powder lines 16 and 18 can be stopped, e.g. automatically, as long as there is a sufficient amount of reclaimed powder in the cyclone separator 48 to supply a sufficient amount of reclaimed powder through the screen device 10 to the powder chamber 22 as required for the spray coating mode of the spraying devices 40. When there is no longer enough reclaimed powder in the cyclone separator 48 for said purpose, an automatic switch can then occur to feeding fresh powder through fresh powder lines 16 or 18. There is also the further option of simultaneously feeding fresh powder and reclaimed powder to the screen device 10 such that they will be mixed together.

The exhaust air of the cyclone separator 48 is routed via an exhaust duct 54 into an afterfilter device 56 and therein through one or more filter elements 58 to the fan 46 and then from there to the outer atmosphere. The filter elements 58 can be filter bags, filter cartridges, filter panels or other such similar filter elements. The coating powder separated out of the airflow by filter element 58 is normally waste powder and drops into a waste receptacle by the force of gravity or it can be, as FIG. 1 shows, routed into a waste receptacle 62 at a waste station 63 via one or more waste lines 60, each having a respective powder pump 4.

Depending on the type of powder and the specific powder coating conditions, the waste powder can also be reclaimed again for screen device 10 so as to be returned back into the coating cycle. This is schematically depicted in FIG. 1 by deflectors 59 and the branch lines 61 of waste lines 60.

Multi-color operation, in which different colors are each sprayed only for a short period of time, normally makes use of the cyclone separator 48 and the afterfilter device 56 and the waste powder of the afterfilter device 56 ends up in the waste receptacle 62. Although the efficiency of the cyclone separator 48 in precipitating powder is generally less than that of the afterfilter device 56, it can be cleaned more quickly than the afterfilter device 56. In single-color operation, during which the same coating powder is used for a long period of time, it is possible to dispense with the cyclone separator 48 and connect the excess powder line 44 to the afterfilter device 56 instead of the exhaust line 54 and connect the waste lines 60, which in this case contain coating powder to be recovered, to the screen device 10 as reclaimed powder lines.

In single-color operation, the cyclone separator 48 is normally only used in combination with the afterfilter device 56 in the case of problematic coating powder. In such a case, only the reclaimed powder of the cyclone separator 48 is fed to the screen device 10 via reclaimed powder line 50 while the waste powder of the afterfilter device 56 is routed as waste into waste receptacle 62 or another waste receptacle which can be placed directly under an outlet opening of the afterfilter device 56 without waste lines 60.

The lower end of the cyclone separator 48 can comprise an outlet valve 64, e.g. a pinch valve. A fluidizing device 66 for fluidizing the coating powder can further be provided above said outlet valve 64 in or at the lower end of the lower end section 48-2 of the cyclone separator 48 designed as a storage reservoir. The fluidizing device 66 contains at least one fluidizing wall 80 made of an open-pored material or a material having narrow holes which is permeable to compressed air albeit not to coating powder. The fluidizing wall 80 is arranged between the path of the powder and a fluidizing compressed air chamber 81. The fluidizing compressed air chamber 81 can be connected to the compressed air source 6 by means of a pressure-setting element 8.

The fresh powder line 16 and/or 18 can be fluidly connected at its upstream end, either directly or via powder pump 4, to a powder conveying tube 70 able to dip into the supplier container 12 or 14 to draw in fresh coating powder. The powder pump 4 can be arranged in the fresh powder line 16 and/or 18 at its beginning, end or a point elsewhere inbetween or at the upper or lower end of the powder conveying tube 70.

FIG. 1 shows a fresh powder bag 12 in a bag receiving hopper 74 as the small fresh powder container. The bag receiving hopper 74 keeps the powder bag 12 in a defined shape, whereby the bag's opening is located at its upper end. The bag receiving hopper 74 can be disposed on a scale or weight sensors 76. Depending on their type, said scale or weight sensors 76 can generate a visual display and/or electrical signal which, after subtracting the weight of the bag receiving hopper 74, corresponds to the weight, and thus also the quantity, of coating powder within the small container 12. At least one vibrating vibrator 78 is preferably arranged on the bag receiving hopper 74.

Two or more small containers 12 can be provided in one respective bag receiving hopper 74 and/or two or more large containers 14 can be provided to be used alternatingly. This enables being able to change more quickly from one to another small container 12 or large container 14.

Although not depicted in FIG. 1, it is conceivable in principle for the screen device 10 to be integrated into the powder container 24. The screen device 10 can furthermore be dispensed with when the fresh powder is of sufficiently good quality. In this case, there is moreover the option of using a separate screen to filter the reclaimed powder of lines 44 and 55, for example upstream or downstream of the cyclone separator 48 or in the cyclone separator 48 itself. Nor does the reclaimed powder then need a screen when its quality is sufficiently good enough for reuse.

The following will make reference to the FIGS. 2 to 6 representations in describing different aspects of the inventive powder conveying device 110. Powder conveying devices 110 according to the invention are particularly suitable as a component of the powder coating system 1 described above with reference to the FIG. 1 representation and comprise a powder conveying tube 70 having a powder inlet 71 via which coating powder can be supplied to the powder conveying tube 70 from a powder container 12, 24, particularly by suction. A powder conveying tube retainer 72 for holding the powder conveying tube is further provided, whereby the powder conveying tube 70 is preferably selectively displaceable relative to the powder conveying tube retainer 72 in the longitudinal direction L of the powder conveying tube 70.

Figures 2A, 2B:
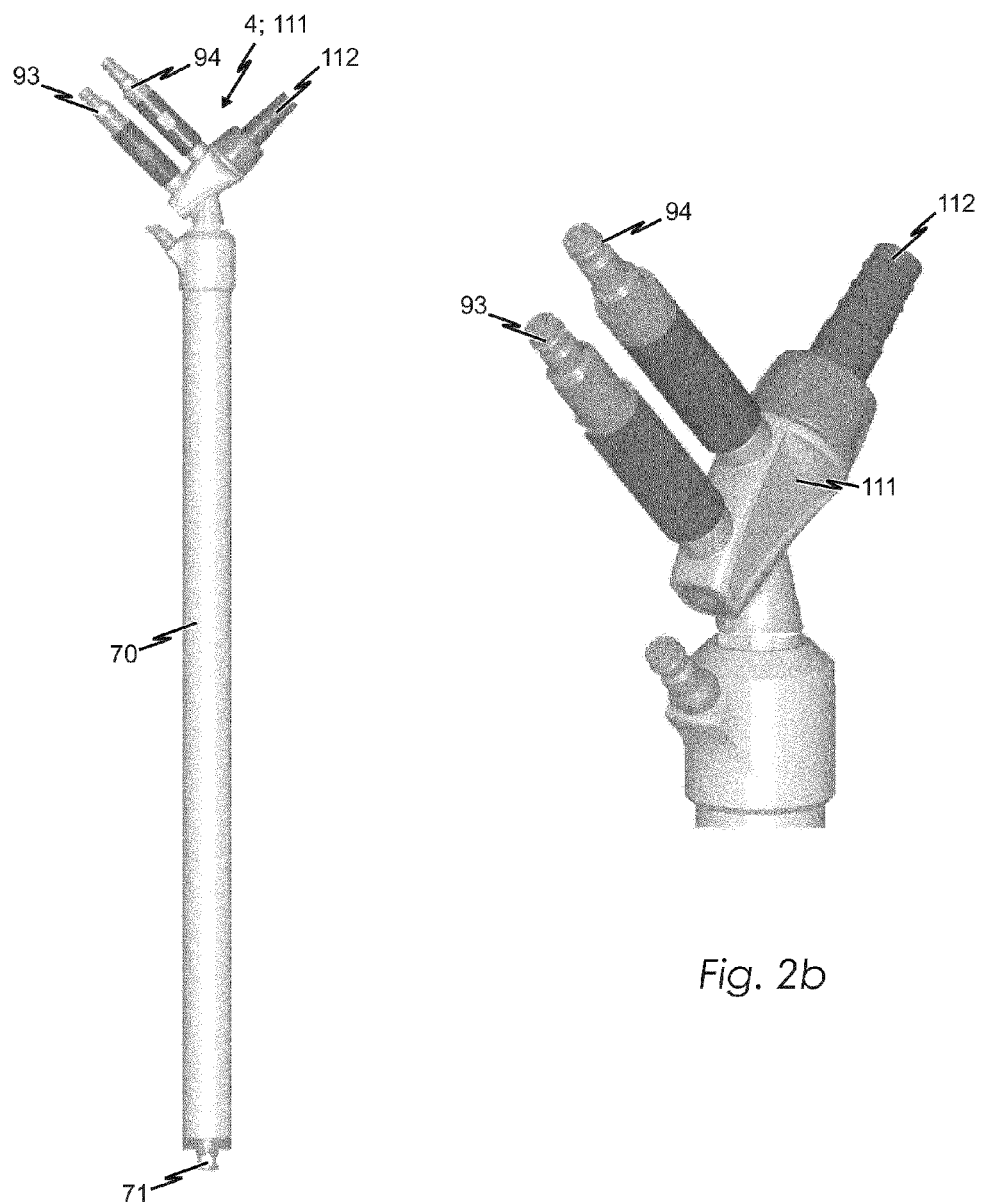
FIG. 2a a side view of the powder conveying tube of an example embodiment of the inventive powder conveying device.
FIG. 2b a perspective view of an injector provided at the upper area of the powder conveying tube depicted in FIG. 2a for drawing in coating powder through the powder conveying tube.

In detail, FIG. 2a shows a side view of the powder conveying tube 70 of an example embodiment of the inventive powder conveying device 110. As shown, a powder pump 4, for example in the form of an injector 111, is provided at an end region of the powder conveying tube 70 here at the upper end region of the powder conveying tube 70 which has a carrier gas connector 93 fluidly connected or connectable to a carrier gas line for the regulated supply of carrier gas, particularly conveyor air.

FIG. 2b shows a perspective view of the injector 11 provided at the upper region of the powder conveying tube 70 depicted in FIG. 2a for drawing coating powder in through the powder conveying tube 70. Additionally to the carrier gas connector 93, the injector 111 is further provided with a dosing gas connector 94 connected or connectable to a dosing gas line in order to supply the injector 111 a regulated feed of dosing gas, particularly dosing compressed air. As is known from the prior art, the carrier gas is supplied to the injector 111 such that an area of negative pressure forms in said injector 111.

Carrier gas, particularly conveyor compressed air, can be supplied to the injector 111 via the carrier gas connector 93 so as to produce negative pressure in a negative pressure area of the injector 111. Doing so sucks coating powder out of a powder container through a powder intake opening (powder inlet 71) and the powder conveying tube 70 and then conveys it through a jet nozzle diffuser 112 (powder outlet) through a powder tube to a receiving point which can be the cited spraying device 40 or a further powder container 24. To support the conveying of powder, the injector 111 can be provided with a dosing gas and/or additional gas connector 94 for supplying dosing gas and/or additional gas (preferably compressed air) into the conveyor air powder flow at the powder outlet.

Figure 3:
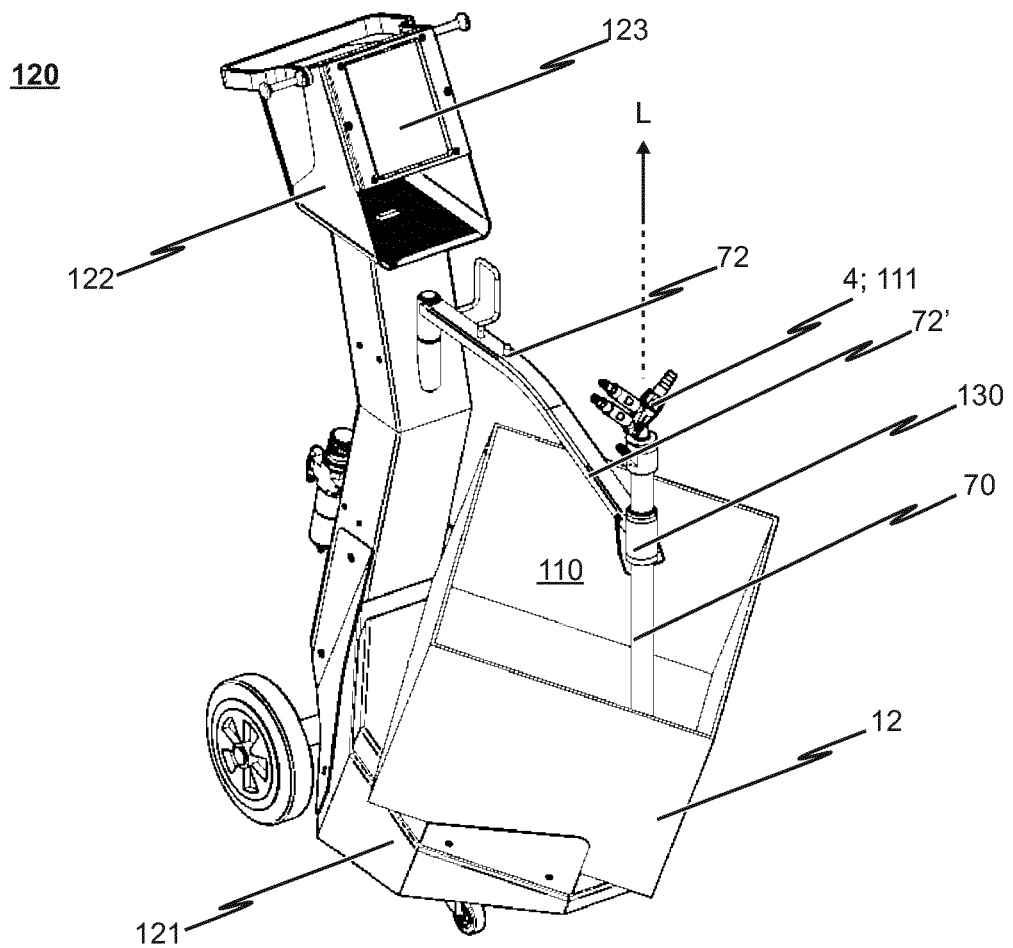

FIG. 3 shows a perspective view of a powder spray coating cart 120 with an example embodiment of a powder conveying device 110 comprising a powder conveying tube 70 in accordance with FIG. 2a. As shown, the powder spray coating cart 120 has a powder container understructure 121 comprising an inclined platform on its upper side. A powder container 12 can be accordingly positioned at a slant on the inclined platform such that the coating powder therein can slide to a wall of the container or into a corner of the container and thereby enable more residual powder to be sucked out of said powder container 12.

In the powder spray coating cart 120 according to FIG. 3, the powder conveying tube 70 of the powder conveying device 110 has an injector 111 at its upper end for pneumatically conveying powder. The powder conveying tube 70 is affixed via a powder conveying tube retainer 72 which comprises an arm portion 72' connected to a base frame of the powder spray coating cart 120.

The powder container understructure 121 can be provided with a vibrator by means of which vibratory movements can be induced in the platform to support the sliding of the coating powder inside the powder container 12.

The example embodiment of the powder spray coating cart 120 according to FIG. 3 further comprises a control unit receptacle 122 having a receiving compartment into which an electronic control unit 123 to control the operation of the at least one spray gun can be inserted. Controlling the operation of the spray gun in particular means controlling at least one flow of compressed air to an injector 111 by means of which coating powder can be drawn out of the powder container 12 and fed into a spray gun flow of compressed air. Controlling the operation of the spray gun can also serve in controlling the supply of compressed air to the spray gun and/or controlling high voltage at the spray gun when the spray gun is designed to that end.

The powder conveying tube 70 of the powder conveying device 110 used in the powder spray coating cart 120 according to FIG. 3 is held by the powder conveying tube retainer 72 such that the powder conveying tube 70 is displaceable in the longitudinal direction L of said powder conveying tube 70. The powder conveying tube retainer 72 preferably supports the powder conveying tube 70 such that it can move freely so as to be able to dip into the powder container 12 by its own pull of gravity and in turn keep pace with the declining level of coating powder inside the powder container 12. It is however also possible to mechanically connect the powder conveying tube 70 to a height regulating device, preferably an automatically controlled lifting device, and for it to be moved up and down by means of said height regulating device.

Figure 6A:
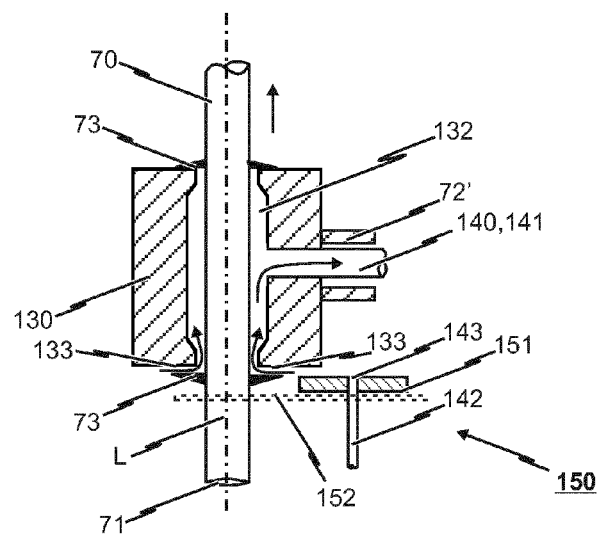
FIG. 6a-c schematic vertical sectional views of different states of a powder conveying tube retainer according to one embodiment of the inventive powder conveying device in order to explain the powder conveying device cleaning process.
Figures 6B, 6C:
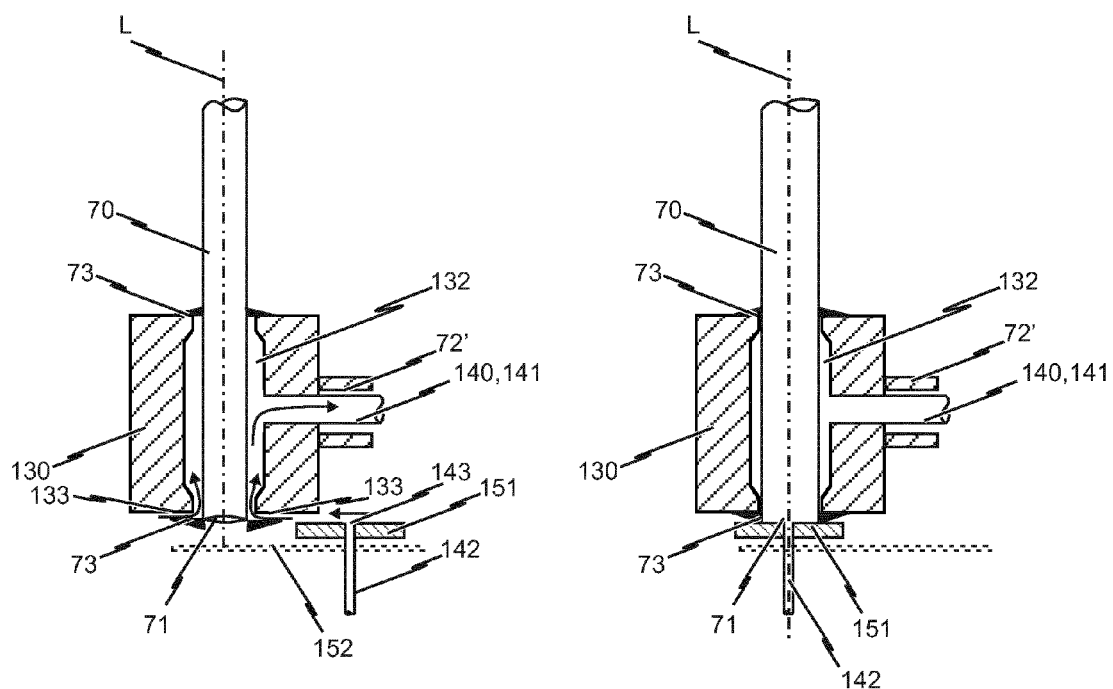

As can be seen in particular in the schematic sectional views of FIGS. 6a to 6c, the powder conveying tube retainer 72 comprises a guide region 130 having an opening 131 arranged coaxially and concentrically to the longitudinal axis of the powder conveying tube 70 through which at least part of the powder conveying tube 70 extends. In detail, and as can particularly be seen from the FIG. 6a representation, the opening 131 of the guide region 130 is configured such that it forms an annular chamber 132 with a section of the powder conveying tube 70 extending through said opening 131 within the guide region 130 which at least partly encloses the section of the powder conveying tube extending through said opening 131 of the guide region 130.

A sealing arrangement 73 is preferably provided which interacts with the powder conveying tube 70 extending through the opening 131 of the guide region 130 to at least partially seal the annular chamber 132. It is for example conceivable for the sealing arrangement 73 to comprise at least one annular seal which concurrently assumes the function of a wiper assembly and mechanically sloughs off powder residue adhering to the outer surface area of the powder conveying tube 70 when the powder conveying tube 70 is displaced in its longitudinal direction L relative to the powder conveying tube retainer 72.

The exemplary powder conveying devices 110 depicted in the figures are preferably further provided with a selectively connectable residual powder extractor 140 to suction off powder residue adhering to the outer surface area of the powder conveying tube 70 when needed. To this end, the residual powder extractor 140 comprises a suction tube 141 connected or connectable to a vacuum source or other such suction mechanism which is preferably integrated or incorporated into the arm portion 72' of the powder conveying tube retainer 72. The intake-side end section of the suction tube 141 of the residual powder extractor 140 is in fluid connection with the annular chamber 132 at least partly enclosing the powder conveying tube region.

Figure 4:
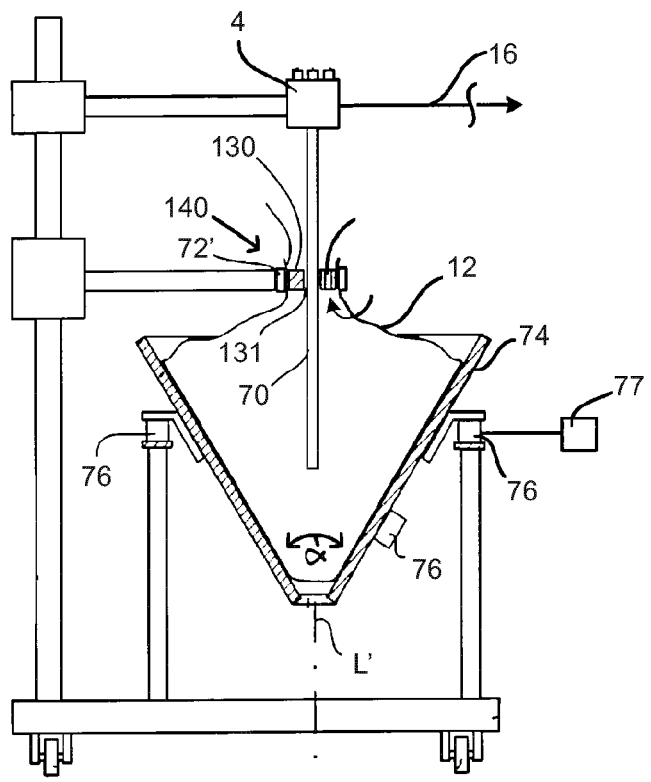
FIG. 4 a schematic vertical sectional view of a further example embodiment of the inventive powder conveying device.

FIG. 4 depicts an example embodiment of a discharging device equipped with a powder conveying device 110 according to the present invention for extracting coating powder out of a powder bag 12 held in a bag receiving hopper 74. In the embodiment as depicted, the bag receiving hopper 74 for holding the powder bag 12 is narrower at the bottom than at the top such that the hopper wall holds the powder bag 12 in a stable shape and position in which the opening of the bag is at its upper end.

The hopper angle α to the inner surface of the bag receiving hopper 74, preferably also to the hopper outer surface, preferably amounts to between 45° and 90°, even more preferentially between 50° and 70°, for example approximately 60°. The powder bag 12 can be made of plastic film, particularly a plastic tubing, which is fused shut at least at the lower end of the tubing forming the lower end of the bag. The upper end of the bag can also be fused shut, however the upper end of the bag will then need to be cut open in order to extract the coating powder. The hopper angle is preferably scaled such that the powder particles can slip downward along the bag wall by the pull of gravity as the amount of powder in the powder bag 12 decreases.

The hopper center axis L' of the bag receiving hopper 74 is preferably aligned vertically. Pursuant other embodiments, the hopper center axis L' can also be disposed at an incline as long as all areas of the funnel-shaped inner surface of the hopper slant upward.

In the embodiment according to FIG. 4, the bag receiving hopper 74 preferably has a circular cross section transverse to the hopper center axis through its entire height along said hopper center axis, although other cross-sectional forms are of course also possible, for example an oval circumferential shape or an angular circumferential shape.

According to one preferential embodiment, the bag receiving hopper 74 is provided with at least one weight sensor 76 for measuring the weight of the bag receiving hopper 74 including its contents, particularly the amount of powder. The at least one weight sensor 76 can be designed so as to visually display the weight and/or designed such that a signaling device 77 operatively connected thereto produces a signal as a function of the measured weight. According to one specific embodiment, the signal is then produced each time a specific minimum weight is reached or the weight falls below the minimum. A signal can also be produced as a function of two or more different powder weights, for example a signal indicating the minimum weight is fast approaching and/or the empty state of the powder bag 12 is fast approaching.

The FIG. 4 embodiment provides for three weight sensors 76 as an example of a scale with which the bag receiving hopper 74 is supported at three different circumferential points. A scale on which the bag receiving hopper 74 rests in order for the bag receiving hopper 74 to be weighed would however also be conceivable.

The bag receiving hopper 74 can be provided with one or more vibrators to vibrate the bag receiving hopper 74 for the purpose of shaking off coating powder from the bag wall and encouraging the coating powder to shift downward in the powder bag 12 as the amount of powder decreases. In the embodiment according to FIG. 4, a powder conveying device 110 having a powder conveying tube 70 with a powder pump 4 at the upper end region of said powder conveying tube 70 is used to empty the powder bag 12 accommodated in the bag receiving hopper 74.

The powder conveying tube 70 is held in position by a powder conveying tube retainer 72 and namely in such a manner that the powder conveying tube 70 can move vertically relative to the powder bag 12. The powder conveying tube retainer 72 exhibits an arm portion 72' which is mechanically connected to a (stationary) base of the powder conveying tube retainer 72 either directly or by means of a height regulating device, preferably an automatically controlled lifting device, so that the arm portion 72' can move up and down vertically.

As is also the case with the powder conveying device 110 according to FIG. 3, in the embodiment according to FIG. 4, the powder conveying tube 70 is correspondingly supported in a guide region 130 of the powder conveying tube retainer 72. Specifically, the lower tube end of the powder conveying tube 70 is preferably positioned toward the lower end of the hopper with its lower tube end being able to move downward as far as or into the vicinity of the lower end of the hopper so that coating powder can also be sucked out of the lowest end of the powder bag 12. According to the preferred embodiments depicted in the figures, the powder conveying tube 70 is disposed at the hopper center axis in the longitudinal direction L' of said hopper center axis and can move up and down.

According to the preferred embodiments of the invention, a powder pump 4 is disposed at the upper end of the powder conveying tube 70. The powder pump 4 can be any known type of pump desired.

The powder conveying tube 70 can be a single powder conveying tube 70 or a plurality of powder tubes.

Figure 5:
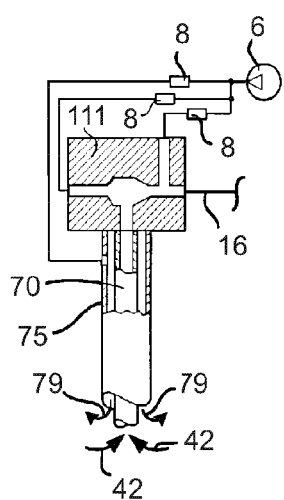
FIG. 5 a schematic detail, partly in vertical cross section, of a powder conveying tube having an injector as a powder pump at its upper end region which is suitable for use in a powder conveying device in accordance with the present invention.

FIG. 5 shows a preferential embodiment in which two tubes are arranged inside the other at a radial spacing as a coupled double-tube unit. The dual tube contains the inwardly disposed powder conveying tube 70 as well as a fluidizing air tube 75 disposed radially outwardly thereof for supplying fluidizing compressed air 79 via a compressed air regulator 8 from a compressed air source 6 to the lower end of the tube where the fluidizing air exits and fluidizes the coating powder at that point; i.e. brings it into a suspended state so it can be more easily conveyed pneumatically through the powder conveying tube 70.

The powder pump 4 for the fresh powder from the powder bag 12 can be arranged in the fresh powder line 16 or, in accordance with the preferred embodiment, at the upper end of the powder conveying tube 70, as is shown e.g. in FIG. 5 using the example of an injector 111. By means of a pressure regulator, the injector 111 is fed conveying compressed air from the compressed air source which produces a negative pressure in the injector 111 resulting in coating powder being sucked out of the powder bag 12 through powder conveying tube 70. The coating powder suctioned up by the flow of conveying compressed air mixes with the conveying compressed air flow and flows together with same through fresh powder line 16 as a compressed air/powder mixture. To prevent deposits of powder in fresh powder line 16, additional compressed air from the compressed air source can also be supplied via a further compressed air regulator at the end of the injector 111 or at the start of the fresh powder line 16.

The following will reference the depictions provided in FIGS. 6*a* to 6*c* in describing the design and operation of the powder conveying tube retainer 72 used in the embodiments according to FIGS. 3 and 4. In detail, FIGS. 6*a* to 6*c* show vertical sectional views of an exemplary embodiment of a powder conveying tube retainer 72 with which the powder conveying tube 70 of the inventive powder conveying device 110 is held.

In accordance thereto, the exemplary embodiment of the powder conveying tube retainer 72 is provided with a guide region 130 which is directly connected to a base of the powder conveying tube retainer 72 by an arm portion 72' or is connected to a base of the powder conveying tube retainer 72 by an arm portion 72' via an interposed height regulating device. An opening 131 is provided in guide region 130 which is arranged coaxially and concentrically to the longitudinal axis of the powder conveying tube 70. At least part of the powder conveying tube 70 extends through said opening 131. The opening 131 is configured so as to form an annular chamber 132 within the guide region 130 with a section of the powder conveying tube 70 extending through said opening 130. Said annular chamber 132 at least partially encloses the section of the powder conveying tube extending through the opening 131 of the guide region 130.

In accordance with the schematic views in FIGS. 6*a* to 6*c*, a sealing arrangement 73 is further provided which interacts with the powder conveying tube 70 extending through the opening 131 of the guide region 130 so as to at least partially seal the annular chamber 132 enclosing the section of the powder conveying tube extending through the opening 131 of the guide region 130. The sealing arrangement 73 additionally assumes the function of a wiper assembly by means of which powder residue adhering to the outer surface area of the powder conveying tube 70 can be wiped off when the powder conveying tube 70 is moved as indicated by the vertically pointing arrow in FIG. 6a—in the longitudinal direction L of said powder conveying tube 70 relative to the guide region 130.

The inventive solution further makes use of a preferably selectively connectable residual powder extractor 140 in order to be able to suction off powder residue adhering to the outer surface area of the powder conveying tube 70 when needed. To this end, it is provided for the residual powder extractor 140 to comprise a suction tube 141 connected or connectable to a vacuum source or other similar suction mechanism which is preferably integrated or incorporated into the arm portion 72' of the powder conveying tube retainer 72. The intake-side end section of the suction tube 141 of the residual powder extractor 140 is or can be brought into fluid connection with the annular chamber 132 at least partially enclosing the powder conveying tube region.

Doing so ensures that cleaning the outer surface area of the powder conveying tube 70 of any residual powder which may have adhered to it can be realized in a simple and yet effective manner. Specifically, all that is necessary thereto is to connect the suction tube 141 of the residual powder extractor 140 to the vacuum source or the suction mechanism respectively and then move the powder conveying tube 70 vertically upward relative to the powder conveying tube retainer 72. Any coating powder which might be adhering to the outer surface area of the powder conveying tube 70 is then either mechanically wiped away or suctioned off by the residual powder extractor 140.

In detail, and as indicated schematically in FIGS. 6a and 6b, the sealing arrangement 73 interacts with the outer surface area of the powder conveying tube 70 such that at least one suction channel 133 remains exposed between the outer surface area of the powder conveying tube 70 and the guide region 130 so that air can flow into the annular chamber 132 via the suction channel 133 when the residual powder extractor 140 is used to suction adhering powder residue out of the annular chamber 132 or from the outer surface area of the powder conveying tube 70 respectively. Arrows are used in FIGS. 6a and 6b to schematically indicate the flow of air passing through the suction channels 133.

In order to additionally clean inside the powder conveying tube 70 as well as the components connected to the powder conveying tube 70, particularly powder pump 4, the invention provides for the powder inlet 71 of the powder conveying tube 70 to be able to be closed and a compressed air line 142 connected to the powder conveying tube 70.

In one preferred realization of the inventive solution and as depicted in FIGS. 6a to 6c, a slider assembly 150 comprising a slider element 151 displaceable relative to the powder conveying tube retainer 72 and relative to the powder conveying tube 70 extending at least partially through the opening 131 of the powder conveying tube retainer 72 is provided for this purpose. Specifically, the slider element 151 of the slider assembly 150 can be moved from a first position, in which the slider element 151 at least partly covers a through-hole 133 of the opening 131 formed in the guide region 130 of the powder conveying tube retainer 72 (see FIG. 6c), into a second position, in which the slider element 151 exposes the through-hole 133 of the opening 131 formed in the guide region 130 such that the powder conveying tube 70 can be displaced relative to the guide region 130 through the opening 131 of the guide region 130 in the longitudinal direction L of the powder conveying tube 70 (see FIGS. 6a and 6b).

The slider assembly 150 is preferably connected to powder conveying tube retainer 72. However, other solutions for attaching the slider assembly 150 are also conceivable.

As suggested in FIGS. 6a to 6c, it is advantageous for the slider assembly 150 to comprise a guide 152 in order to guide the movement of the slider element 151 from its first position into its second position and vice versa. The guide 152 can be realized for example as guide rails or the like.

The slider element 151 of the slider assembly 150 thus enables the powder inlet 71 of the powder conveying tube 70 to be closed and a compressed air line 142 to be connected to the (closed) powder conveying tube 70 during the cleaning mode and when the powder conveying tube 70 is displaced upward relative to the powder conveying tube retainer 72 in longitudinal direction L until the intake-side end section of the powder conveying tube 70 is at the height of the powder conveying tube retainer 72 (see FIG. 6b).

The compressed air line 142 preferably comprises a compressed air outlet 142 which is connected to the slider element 151 such that the compressed air outlet 142 empties into the through-hole 133 of the opening 131 formed in the guide region 130 in the first position of the slider element 151. By so doing, compressed cleaning air can be fed to the interior of the powder conveying tube 70 to clean the interior of the tube as well as the interior of a powder pump 4 connected to the powder conveying tube 70. It is hereby particularly advantageous for compressed air to be supplied in pulses into the intake-side end of the powder conveying tube 70.

The invention is not limited to the embodiments as exemplarily depicted in the drawings but rather yields from an overall view of all the features disclosed herein together.

It is particularly conceivable to use a closure assembly having for example a hinged closure element instead of a slider assembly 150 having a slider element 151 for closing off the powder inlet 71 of the powder conveying tube 70 when needed.

The invention claimed is:

1. A device for conveying coating powder out of a powder container, wherein the device comprises:
    a powder conveying tube having a powder inlet via which coating powder from the powder container can be fed to the powder conveying tube by suction; and
    a powder conveying tube retainer for holding the powder conveying tube;
    wherein the powder conveying tube is selectively displaceable relative to the powder conveying tube retainer in the longitudinal direction of the powder conveying tube, and wherein for the purpose of cleaning the powder conveying tube, the powder inlet of the powder conveying tube can be closed and a compressed air line can be connected to the powder conveying tube,
    wherein the powder conveying tube retainer comprises a guide region with an opening arranged coaxially and concentrically to the longitudinal axis of the powder conveying tube through which at least part of the powder conveying tube extends,
    and wherein:
    a slider/closure assembly comprising a slider/closure element is provided which is displaceable relative to the powder conveying tube retainer and relative to the powder conveying tube extending at least in part through the opening of the powder conveying tube retainer from a first position, in which the slider/closure element at least partly covers a through-hole of the opening formed in the guide region, into a second position, in which the slider/closure element uncovers the through-hole of the opening formed in the guide region such that the powder conveying tube is displaceable relative to the guide region through the opening of the guide region in the longitudinal direction of the powder conveying tube, and a compressed air outlet of the compressed air line is connected to the slider/closure element such that the compressed air outlet leads into the through-hole of the opening formed in the guide region in the first position of the slider/closure element.

2. The device according to claim 1, wherein the opening of the guide region is configured such that the opening forms an annular chamber with a section of the powder conveying tube extending through said opening within the guide region which at least partly encloses the section of the powder conveying tube extending through said opening of the guide region.

3. The device according to claim 2, wherein a sealing arrangement is provided which interacts with the powder conveying tube extending through the opening of the guide region to at least partially seal the annular chamber enclosing the section of the powder conveying tube extending through the opening of the guide region such that at least one suction channel remains exposed between the outer surface area of the powder conveying tube and the guide region through which air can flow into the annular chamber.

4. The device according to claim 1, wherein a wiper assembly is provided for mechanically wiping off powder residue adhering to the outer surface area of the powder conveying tube.

5. The device according to claim 4, wherein the wiper assembly interacts with the section of the powder conveying tube extending at least partially through the opening of the guide region such that upon the powder conveying tube displacing relative to the powder conveying tube retainer in the longitudinal direction of the powder conveying tube, powder residue adhering to the outer surface area of the powder conveying tube can be at least partly mechanically wiped off the outer surface area of said powder conveying tube.

6. The device according to claim 1, wherein a residual powder extractor is provided to suction off any powder residue adhering to the outer surface area of the powder conveying tube when needed.

7. The device according to claim 6, wherein the residual powder extractor comprises a suction tube connected or connectable to a vacuum source or other such suction mechanism to suction off powder residue adhering to the outer surface area of the powder conveying tube.

8. The device according to claim 7, wherein the powder conveying tube retainer comprises an arm portion connected to the guide region via which the guide region is connected to a base of the powder conveying tube retainer.

9. The device according to claim 7, wherein the suction tube is at least partially integrated or incorporated into the arm portion of the powder conveying tube retainer.

10. The device according to claim 7, wherein the opening of the guide region is configured such that the opening forms an annular chamber with a section of the powder conveying tube extended through said opening within the guide region which at least partly encloses the section of the powder conveying tube extending through said opening of the guide region, and an intake-side end section of the suction tube of the residual powder extractor is in or can be brought into fluid connection with the annular chamber at least partially enclosing the powder conveying tube section.

11. The device according to claim 1, wherein the slider/closure assembly (150) is connected to the powder conveying tube retainer.

12. The device according to claim 11, wherein the slider/closure assembly comprises a guide in order to guide the movement of the slider element from its first position into its second position and vice versa.

13. The device according to claim 1, wherein the compressed air line is connected or connectable to a compressed air source for introducing compressed air into the intake-side end of the powder conveying tube during the cleaning mode of the device, wherein the compressed air is supplied in pulsed manner.

14. A powder coating system for spray coating objects with coating powder, wherein the powder coating system comprises at least one powder conveying device in accordance with claim 1 for conveying coating powder out of a powder container to at least one spraying device.

15. The powder coating system according to claim 14, wherein the powder container is a supplier container, particularly a powder bag accommodated in a bag receiving hopper.

16. A method for cleaning a powder conveying device according to claim 1, wherein the method comprises:
displacing the powder conveying tube of the powder conveying device relative to the powder conveying tube retainer in the longitudinal direction of the powder conveying tube such that any powder residue which may being adhering to the outer surface area of the powder conveying tube can be at least partly mechanically wiped by a wiper assembly provided on the powder conveying tube retainer; and
closing the powder inlet of the powder conveying tube and connecting a compressed air line to the powder conveying tube, wherein compressed cleaning air is fed in preferably pulsed manner into the interior of the powder conveying tube via compressed air line,
wherein the powder inlet is closed by a slider/closure element connected to the compressed air line.

17. The method according to claim 16, wherein a residual powder extractor is used to suction off any powder residue which may be adhering to the outer surface area of the powder conveying tube upon the displacing of the powder conveying tube relative to the powder conveying tube retainer.

\* \* \* \* \*